US008831672B2

(12) United States Patent
Frenger et al.

(10) Patent No.: US 8,831,672 B2
(45) Date of Patent: Sep. 9, 2014

(54) METHOD AND ARRANGEMENT IN A COMMUNICATION SYSTEM

(75) Inventors: Pål Frenger, Linkoping (SE); Ove Linnell, Sturefors (SE); Johan Moe, Mantorp (SE)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 271 days.

(21) Appl. No.: 13/514,630

(22) PCT Filed: Dec. 8, 2009

(86) PCT No.: PCT/SE2009/051389
§ 371 (c)(1),
(2), (4) Date: Jun. 8, 2012

(87) PCT Pub. No.: WO2011/071425
PCT Pub. Date: Jun. 16, 2011

(65) Prior Publication Data
US 2012/0252525 A1   Oct. 4, 2012

(51) Int. Cl.
*H04W 52/02* (2009.01)
*H04W 52/04* (2009.01)

(52) U.S. Cl.
CPC .......... *H04W 52/04* (2013.01); *H04W 52/0206* (2013.01); *Y02B 60/50* (2013.01); *Y02B 60/40* (2013.01)
USPC ........ 455/524; 455/127.5; 455/572; 455/574; 455/127.1; 455/522; 320/101; 320/137; 320/132; 307/66; 307/80

(58) Field of Classification Search
CPC ..... H04W 52/04; H04W 52/00; H04W 52/02; H04W 52/0206; H04W 4/00; H04W 4/001; H04W 16/00; H04W 16/02; H04W 16/14; H04W 16/24; Y02B 60/50; Y02B 60/40; Y02B 60/41; Y02B 60/42

USPC .............. 455/524, 507, 572, 573, 574, 127.1, 455/127.2, 127.5, 410, 407, 550, 575, 522, 455/9, 13.4, 67.11, 115.1, 220; 307/66, 80; 370/252, 329; 320/137, 132, 101, 161, 320/138, 133, 134, 136
See application file for complete search history.

(56) References Cited

U.S. PATENT DOCUMENTS

| | | | |
|---|---|---|---|
| 5,815,807 A * | 9/1998 | Osmani et al. ................ 455/410 |
| 5,838,140 A * | 11/1998 | Rosenthal .................... 320/133 |
| 6,480,149 B1 * | 11/2002 | Sutherland et al. ...... 342/357.52 |
| 2007/0200433 A1* | 8/2007 | Kelty ............................ 307/66 |
| 2010/0098138 A1* | 4/2010 | Mishra et al. ................ 375/219 |
| 2011/0077758 A1* | 3/2011 | Tran et al. ...................... 700/94 |
| 2013/0070635 A1* | 3/2013 | Suo et al. ...................... 370/252 |
| 2013/0099576 A1* | 4/2013 | Chuah et al. .................. 307/80 |
| 2013/0099720 A1* | 4/2013 | Chuah et al. .................. 320/101 |
| 2013/0195040 A1* | 8/2013 | Sanderford et al. .......... 370/329 |

* cited by examiner

Primary Examiner — Tan Trinh

(57) ABSTRACT

A method in a communication system for managing energy consumption of base stations within the communication system includes computing a marginal energy value for a first base station based on an energy source type of the first base station and computing a marginal energy value for a second base station based on an energy source type of the second base station. The method also includes comparing the marginal energy value for the first base station and the marginal energy value for the second base station. Additionally, the method includes adjusting an amount of wireless communication managed by the first base station in relation to the second base station, such that the amount of wireless communication managed by the first base station is increased if the first base station has a lower marginal energy value than the second base station, or the amount of wireless communication managed by the first base station is decreased if the first base station has a higher marginal energy value than the second base station.

24 Claims, 6 Drawing Sheets

METHOD AND ARRANGEMENT IN A COMMUNICATION SYSTEM

TECHNICAL FIELD

The present invention relates to a method and an arrangement in a communication system and, more in particular, to a mechanism for improving the performance within the communication system.

BACKGROUND

Today's mobile networks/communication systems have a strong potential for energy savings. The design of communication systems has until now been focused optimizing coverage and capacity for high traffic load scenarios and little attention has been put on network energy savings for the more common low traffic scenarios. This design philosophy has resulted in that today's radio base stations consume more than 50% of the maximum energy consumption even when no traffic is served. However, there is no fundamental reason why an idle base station needs to consume more than e.g. 1% of the maximum energy consumption when it is idle.

Not all cellular sites comprised in a communication system are connected to the Alternate Current (AC) grid and in a typical network different sites may use different energy supply sources such as e.g. AC grid, diesel, solar, wind, hybrid etc, see FIG. 1. These energy sources differ significantly in both marginal energy cost, i.e. the additional cost of producing one extra kWh; and in marginal carbon dioxide emissions i.e. the additional carbon dioxide emissions of one extra kWh produced. The energy solutions also differ in energy storage possibilities. Diesel can be saved for later use but wind and solar energy are intermittent and once the back-up battery of an off-grid site is fully charged, any additional renewable energy supply will be wasted. Thus an off-grid site with renewable energy supply may have an energy surplus that is wasted, e.g. during weekends with low traffic or on a windy or sunny day.

By simply minimizing the network energy consumption at all times operators do not automatically also minimize energy cost and/or carbon dioxide emissions.

Further, in a communication system according to known solutions the requirements on functionality and operability, comprising high reliability, availability and low power consumption, is a problem to achieve. Known communication systems and their power supplies are for the most time built-up by units from different types and manufactures, which usually implies that each power supply unit must function without knowing or being able to communicate with other power supply units comprised within the communication system. This renders difficulties when trying to optimize the functionality and efficiency of the communication system in total.

SUMMARY

It is an object to obviate at least some of the above disadvantages and provide an improved communication system.

According to a first aspect, the object is achieved by a method in an energy management unit. The energy management unit is situated in a communication system for energy consumption balancing between a first base station and a second base station. The first base station and the second base station are comprised within the communication system. The method comprises computing a marginal energy value for the first base station and the second base station respectively, based on the energy source type of each base station. The computed respective marginal energy value for the first base station and the second base station are then compared with each other. The method also comprises adjusting the amount of wireless communication managed by the first base station, in relation to the second base station. The adjustment is performed such that the amount of wireless communication managed by the first base station is increased if the first base station has a lower marginal energy value than the second base station. Alternatively is the amount of wireless communication managed by the first base station decreased if the first base station has a higher marginal energy value than the second base station.

According to a second aspect, the object is also achieved by an arrangement in an energy management unit. The energy management unit is situated in a communication system for energy consumption balancing between a first base station and a second base station. The first base station and the second base station are comprised within the communication system. The arrangement comprises a computing unit. The computing unit is adapted to compute a marginal energy value for the first base station and the second base station respectively, based on the energy source type of each base station. Also, the arrangement comprises a comparison unit. The comparison unit is adapted to compare the computed respective marginal energy value for the first base station and the second base station with each other. In addition, the arrangement comprises an adjustment unit.

The adjustment unit is adapted to adjust the amount of wireless communication managed by the first base station, in relation to the second base station. The adjustment is performed such that the amount of wireless communication managed by the first base station is increased if the first base station has a lower marginal energy value than the second base station. Alternatively is the amount of wireless communication managed by the first base station decreased if the first base station has a higher marginal energy value than the second base station.

Thanks to the present methods and arrangements, it is possible to reduce energy costs by utilizing renewable energy sources, when possible, instead of non renewable energy sources. The marginal cost of renewable energy is close to zero while the marginal cost of grid energy is typically lower than the marginal cost of diesel energy. However, installing renewable energy sources on all sites may be too expensive and in many sites it may not be possible e.g. for practical reasons. Instead the present solution allows operators to divert traffic to nodes with renewable energy whenever possible. Installing grid power at all sites may not be possible either. However, neighbouring grid powered sites can take over traffic from diesel powered off-grid sites or from off-grid sites with temporarily insufficient supply of renewable energy. Also, by switching off redundant units, the lifetime of these units may be prolonged.

The present method may also enable operators to cost effectively reduce the carbon dioxide emissions caused by their network operation by using renewable, clean energy whenever possible. Thus an improved mechanism within a communication system is provided.

Other objects, advantages and novel features of the invention will become apparent from the following detailed description.

BRIEF DESCRIPTION OF THE DRAWINGS

The present invention will now be described more in detail in relation to the enclosed drawings, in which.

DETAILED DESCRIPTION

The present solution is defined as a method and an arrangement in a communication system, which may be put into practice in the embodiments described below. The present solution may, however, be embodied in many different forms and should not be construed as limited to the embodiments set forth herein; rather, these embodiments are provided so that this disclosure will be thorough and complete, and will fully convey the scope of the present solution. It should be understood that there is no intent to limit the present methods, and/or arrangements to any of the particular forms disclosed, but on the contrary, the present methods and arrangements are to cover all modifications, equivalents, and alternatives falling within the scope of the present solution as defined by the claims.

The present solution may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

Figure 1:
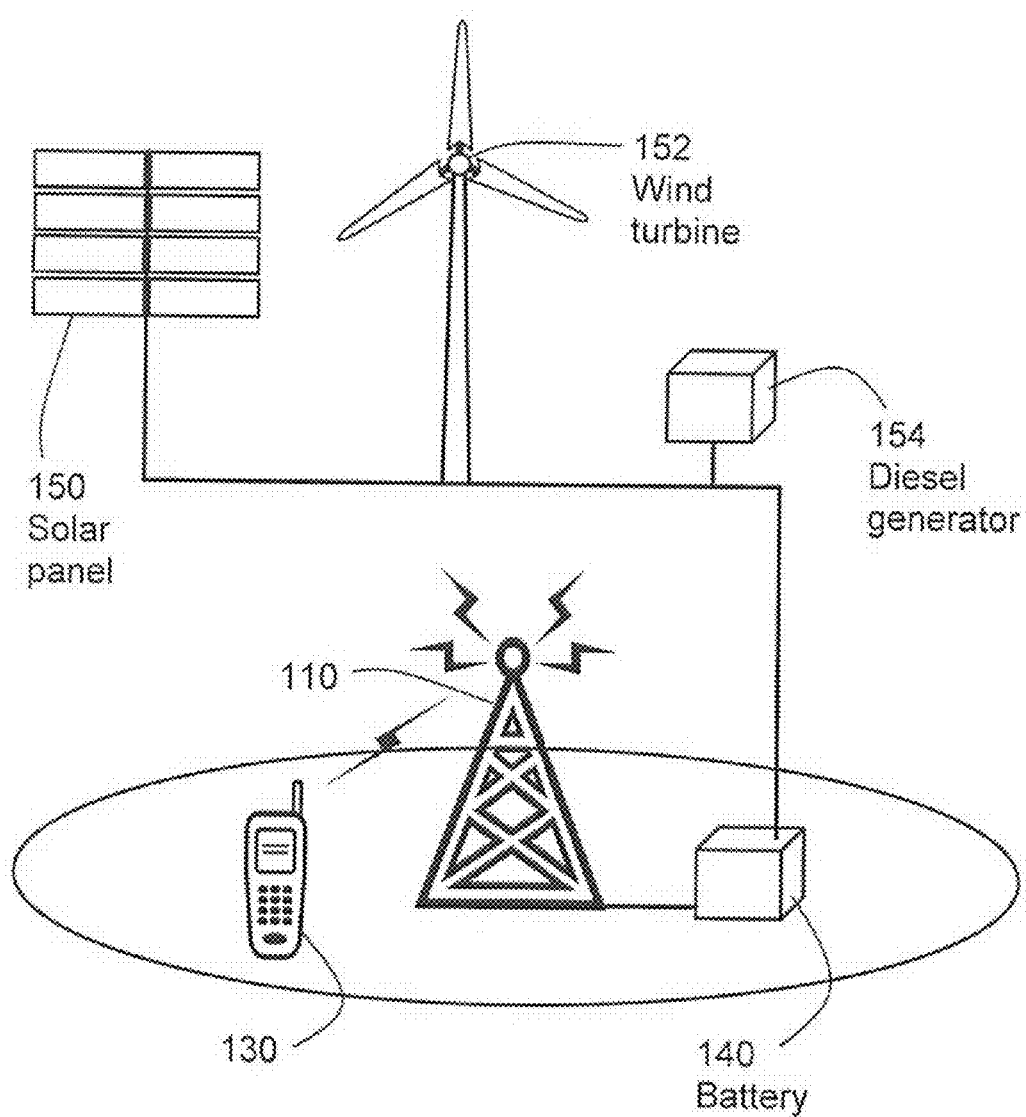
FIG. 1 is a schematic block diagram illustrating an off-grid cellular site, according to prior art.
Figure 2:
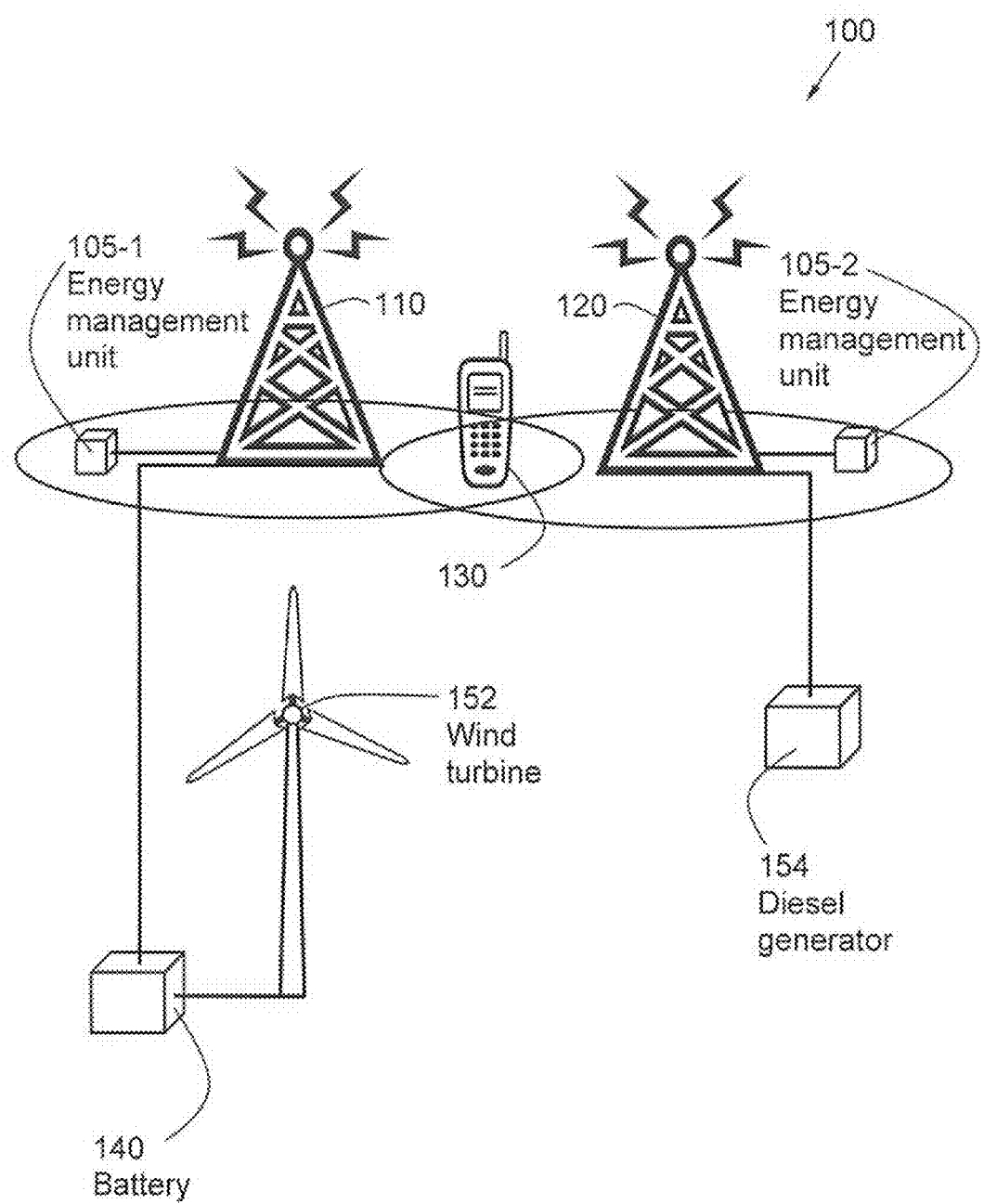
FIG. 2 is a block diagram illustrating a communication system according to some embodiments.

FIG. 2 is a block diagram illustrating a communication system 100 according to some embodiments. The communication system 100 comprises a first base station 110 and a second base station 120.

In the illustrated exemplary communication system 100, the first base station 110 may be attached to a first energy management unit 105 and to a battery 140, which may provide energy supply to the first base station 110. The optional battery 140 may in turn be charged by an energy source such as e.g. a wind turbine 152. Whether the backup battery 140 is attached in series, as shown in example in FIG. 2, on in parallel (not shown) with the main power supply is irrelevant for this invention.

The second base station 120 may be attached to a second energy management unit 105 and to an energy source such as e.g. a diesel generator 154. It is to be mentioned that the feature "diesel generator" is here used as a non limiting example only, of any fuel driven generator, such as e.g. ethanol, petrol, gasoline, biogas, methanol, methane, tar sand, charcoal, biodiesel, propane, butanol, vegetabile oil, kerosene, biomass, wood, liquefied natural gas, liquefied petroleum gas, liquid nitrogen, hydrogen, wood gas, algae oil and/or municipal waste, just to briefly mention some few arbitrary examples.

Although only two base stations 110, 120 are shown in FIG. 2, it is to be understood that another configuration of base station transceivers may be connected through, for example, a mobile switching centre and other network nodes, to define the communication system 100. Further, any of the base stations 110, 120 may be referred to as e.g. a Remote Radio Unit, an access point, a Node B, an evolved Node B (eNode B) and/or a base transceiver station, Access Point Base Station, base station router, etc depending e.g. of the radio access technology and terminology used.

A user equipment (UE) 130 may be situated within a cell created by any of the first base station 110 or the second base station 120.

In some embodiments, the user equipment 130 may be represented by a wireless communication device, a wireless communication terminal, a mobile cellular telephone, a Personal Communications Systems terminal, a mobile station (MS), a Personal Digital Assistant (PDA), a laptop, a terminal, computer or any other kind of device capable of managing radio resources.

Further, a number of batteries 140 may be comprised within the communication system 100. The batteries 140 serves as uninterruptible power supply and may also provide emergency power in case of a main power failure. The batteries 140 are adapted to provide uninterrupted power to connected equipment, such as the base stations 110, 120.

The base stations 110, 120 which utilizes the batteries 140 may thus normally get its power directly from a sustainable Alternating Current (AC) source or a Direct Current (DC) source e.g. from solar cells connected to the respective base stations 110, 120, according to different embodiments as previously described. The batteries 140 may according to some embodiments power the base stations 110, 120 only in the event of failure. The batteries 140 may otherwise be charged, at least occasionally, from the primary circuit.

The batteries 140 may be e.g. flooded Lead-Acid Battery, Ni-Cad or AGM sealed Lead Acid batteries, just to mention some few arbitrary battery types. However, the present solution may be applied using any kind of suitable battery for the batteries 140, which batteries 140 furthermore may be of the same type or of several different types.

The communication system 100 may be based on technologies such as e.g. Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS), Wireless Local Area Networks (WLAN), Wireless Fidelity (WiFi), Worldwide Interoperability for Microwave Access (WiMAX), Bluetooth or according to any other wireless communication technology, just to mention some few arbitrary and none limiting examples.

The present solution presents a mechanism for balancing the energy consumption in a cellular radio network such as e.g. the illustrated communication system 100, such that base stations 110, 120 with low marginal energy cost and/or low marginal carbon dioxide emissions are prioritized in load balancing and/or handover algorithms. Thus radio traffic e.g. created by the user equipment 130 may be directed from the diesel powered second base station 120, towards the first base station 110, which has lower marginal energy cost and/or lower marginal carbon dioxide emissions, according to some embodiments.

The mechanism for balancing the energy consumption is performed in the respective energy management unit 105. In the embodiment illustrated in FIG. 2, each base station 110, 120 comprise an energy management unit 105 each and the mechanism may be distributed. However, as will be discussed later in connection with FIG. 3, the energy management unit 105 may be situated in a centralized node within the communication system 100.

Further, communication systems 100 are dimensioned for a certain coverage and capacity during peak hours. During low traffic hours the service level that can be provided by a (non diesel powered) neighboring cell might be sufficient, according to some embodiments.

According to some embodiments of the present solution, load balancing algorithms may adjust cell reference power and/or antenna tilt in order to make base stations 110 with a local and temporary renewable energy surplus cover a larger area; and diesel powered base stations 120, with neighbouring grid powered base stations or renewable powered base stations 110 with an energy surplus, cover a smaller area. By increasing, or reducing, respectively, the coverage of a base station 110, 120 also the amount of traffic that is picked up by this base station 110, 120 is increased (or reduced, respectively). This in turn increases (or reduces, respectively) the energy consumption of the base station 110, 120 while reducing (or increasing) the energy consumption of neighbouring base stations 110, 120.

According to some embodiments of the present solution, handover algorithms may adjust threshold parameters such that user equipments 130 are more likely to perform handovers to base stations 110, 120 with a local and temporary renewable energy surplus, such as the first base station 110; and less likely to perform handovers from a grid powered cell or from a renewable powered cell with an energy surplus to a diesel powered base station 110, 120, such as the second base station 120.

It is to be noticed that also the diesel generated second base station 120 comprises an energy management unit 105. The energy management unit 105 of the diesel generated second base station 120 may further be utilized for reducing the overall diesel consumption, or which activates when the generator is about to run out of diesel. In such case, the energy management unit 105 may direct the radio traffic towards a neighbour base station. This may be performed also in case the neighbour base station also is diesel powered, as it is cheaper and more rational for the operator to fill up diesel in a plurality of base station generators at the same time than to fill up different base station generators individually at different times. The computing of energy cost may according to some embodiments take also the refill cost of the operator into account.

The renewable power and/or local and temporary renewable energy as herein described may comprise e.g. solar energy, wind energy, hydro power and/or hybrid energy, just to mention some examples. The renewable energy may thus be energy generated from natural resources such as sunlight, wind, rain, tides, and geothermal heat, which are renewable.

Hydro power, hydraulic power or water power is power that is derived from the force or energy of moving water, which may be harnessed for useful purposes. Some examples include: waterwheels, hydroelectricity (hydroelectric dams, or hydroelectric-powered watermills), damless hydro, which captures the kinetic energy in rivers, streams and oceans, vortex power, which creates vortices which can then be tapped for energy, tidal power, which captures energy from the tides in horizontal direction, tidal stream power, which does the same vertically, wave power, which uses the energy in waves, osmotic power, which channels river water into a container separated from sea water by a semi permeable membrane, marine current power which captures the kinetic energy from marine currents, ocean thermal energy conversion which exploits the temperature difference between deep and shallow waters, just to mention some few examples of hydro power which may be used for powering a base station 110, 120.

Handover algorithms in e.g. LTE and HSPA are network controlled and assisted by the user equipment 130, i.e. the user equipment 130 provides the serving base station 110, 120 with measurements on handover candidates, and based on these measurements the serving base station 110, 120 decides if a handover shall be performed or not. The serving base station 110, 120 controls the measurement of the user equipment 130 and may report procedures but the actual handover decision is taken by the network. Consequently, as an alternative to changing the user equipment measurement and reporting criteria, as discussed above, the handover decision in the base station 110, 120 may be based on normal user equipment measurement reports that are combined with information about the energy type and energy surplus of reported handover candidates. In case a handover is motivated from a pure signal strength point of view, based on user equipment reports, the serving base station 110, 120 may still decide that a handover is not motivated from an energy point of view, or vice versa.

The allowed parameter range of handover and load balancing algorithms according to some embodiments of the present method may be pre-calculated using a network planning tool or may be calculated dynamically by an Operation and Management (O&M) system. As an example, micro cells may adjust antenna tilt with $\pm X$ degrees as well as reduce cell reference power all the way down to zero, while macro cells may only adjust the handover threshold $\pm Y$ dB. Sites with multiple frequency bands may not be allowed to adjust load balancing and handover parameters one frequency band, in order to ensure coverage, but may do so on all other frequency bands. Sites with multiple radio access technologies such as e.g. GSM, WCDMA/HSPA, LTE may only be allowed to adjust load balancing and handover parameters on some radio access technologies (e.g. WCDMA/HSPA, LTE) and not on other radio access technologies (e.g. GSM).

Figure 3:
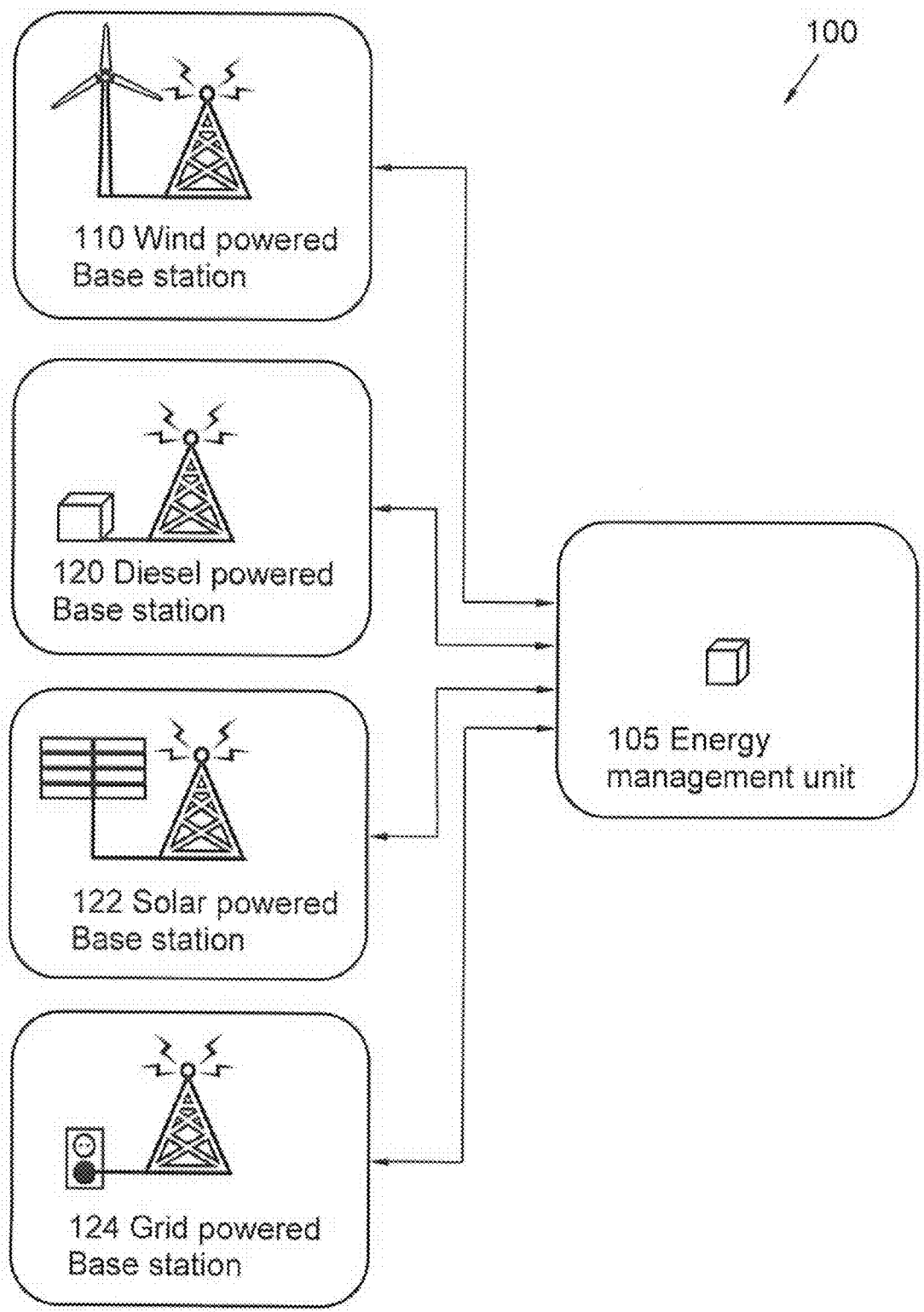
FIG. 3 is a block diagram illustrating embodiments of an arrangement in a communication system.

The present method may according to different embodiments be implemented e.g. as a distributed algorithm with direct base station communication; or as a centralized algorithm with communication between base station 110, 120 and O&M system (OSS), which will be further discussed in relation to the presentation of FIG. 3.

The communication system 100 illustrated in FIG. 2 illustrates a distributed implementation, which may comprise local exchange of energy supply information between neighbouring nodes 110, 120 comprising of e.g. energy source information, such as e.g. AC grid, diesel, solar, wind, hybrid; marginal energy cost information (€/kWh); marginal energy carbon dioxide emissions (kg carbon dioxide/kWh); energy reliability information (battery reserve, current renewable energy surplus, AC grid reliability), for example. This exchanged information may be used for performing a distributed energy consumption balancing within each energy management unit 105, according to some embodiments.

FIG. 3 is a block diagram illustrating embodiments of an arrangement in a communication system 100, according to some embodiments, wherein a centralized implementation of the present method is illustrated. The exemplary communication system 100 comprises a wind powered base station 110, a diesel powered base station 120, a solar powered base station 122, a grid powered base station 124 and a central node comprising an energy management unit 105. The central node comprising the energy management unit 105 may be the O&M system (e.g. OSS). Relevant information concerning e.g. energy source information, such as e.g. AC grid, diesel, solar, wind, hybrid; marginal energy cost information (€/kWh); marginal energy carbon dioxide emissions (kg carbon dioxide/kWh); energy reliability information (battery reserve, current renewable energy surplus, AC grid reliability), for example is collected from the base stations 110, 120, 122, 124. Based on that information, the energy management unit 105 may perform a network energy balancing.

Figure 4A:
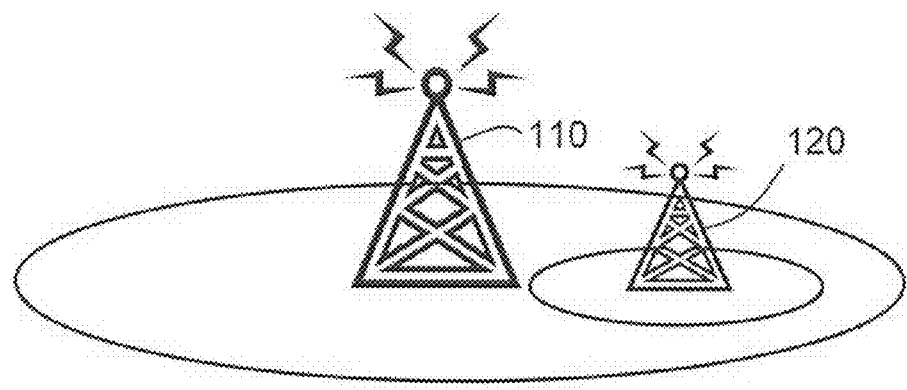
FIG. 4A is a block diagram illustrating a communication system according to some embodiments.
Figure 4B:
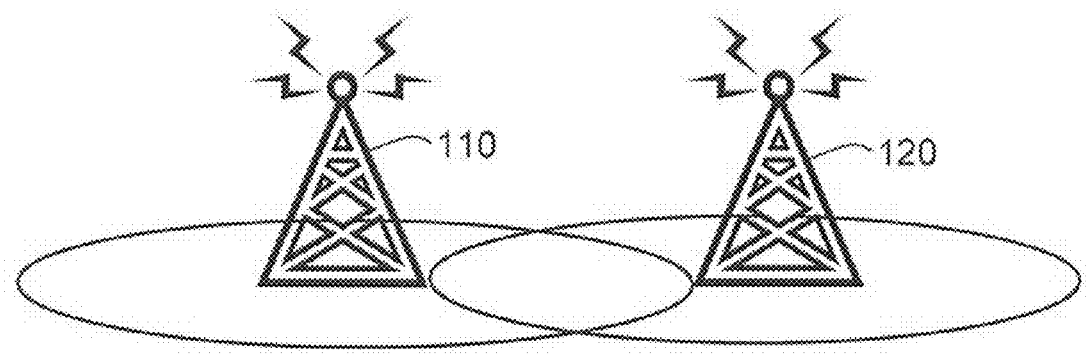
FIG. 4B is a block diagram illustrating a communication system according to some embodiments.

When performing network energy balancing optimization by adjusting parameters of load balancing and handover algorithms it may be an advantage to know if a certain base station 110, 120, 122, 124 provides coverage in a certain area, or if coverage in said area is already provided by another base station 110, 120, 122, 124. In FIG. 4A is illustrated a typical case that may be denoted "strong energy balancing case" and in FIG. 4B is another typical case illustrated, which may be referred to as a "weak energy balancing case". The strong energy balancing case depicted in FIG. 4A is characterized by that the cell of the second base station 120 is completely comprised within the cell of the first base station 110. According to some embodiments, the cell of the second base station 120 may be represented by a micro cell, pico cell, hot spot or similar, which may be used to improve the performance within the communication system 100 during rush hours. In the weak energy balancing case illustrated in FIG. 4B, the cell of the first base station 110 and the cell of the second base station 120 are partly covering each other.

According to some optional embodiments, it may be identified which case that is applicable for a certain cell. It may further be determined "off-line" in a network planning tool. In a strong energy balancing case the parameter space in which adjustment are allowed in order to balance the network energy consumption may be much larger compared to the weak energy balancing case. The present energy consumption prioritization matrix for two neighbouring cells (denoted 110 and 120) shows which cell that the energy balancing method tries to divert the traffic to, and how this depends on the energy supply source of the respective cells, according to some embodiments.

|  | AC grid | Diesel | Renewable |
| --- | --- | --- | --- |
| AC grid | Neutral | 110 | 120 |
| Diesel | 120 | Neutral | 120 |
| Renewable | 110 | 110 | Neutral |

The present method may in particular be suited for implementation in hierarchical radio network, e.g. where a macro layer provides coverage on a first carrier f1 while a micro layer provides additional capacity in hotspot areas on a second carrier f2. In such a scenario the size of the cells in the micro layer can be freely adjusted e.g. in order to attract more traffic and reduce the amount of traffic in the macro layer when a micro cell has a surplus of renewable energy. The fact that the cell layers operate on different frequencies ensures that no problems with inter-cell interference between the macro and the micro layers occur.

In case an operator wants to upgrade a communication system 100 comprising a plurality of diesel powered off-grid sites, such that they run on renewable energy instead, then the present method may provide the tool required to perform the upgrade gradually while at the same time ensure that the investment in renewable energy is utilized. Selecting a scattered set of sites that are capable of taking over as much traffic as possible from neighbouring sites with non-renewable energy sources for the first upgrade iteration may then be preferred methodology, rather than to start upgrading all sites in a given area, according to some embodiments.

Which base station energy sources to upgrade into renewable energy sources, and in what order the upgrades may be installed, can be determined by using network planning tools.

By using the present method, operators may be able to reduce energy cost by utilizing the cheapest energy source possible at all times. The marginal cost of renewable energy is close to zero while the marginal cost of grid energy is typically lower than the marginal cost of diesel energy.

By using this invention operators can also maximize use of invested CAPEX in energy supply. Installing renewable energy sources on all sites may be too expensive and in many sites it may not be possible e.g. for practical reasons. Instead the present method allows operators to divert traffic to nodes with renewable energy whenever possible. Installing grid power at all sites may not be possible either. However, neighbouring grid powered sites can take over traffic from diesel powered off-grid sites or from off-grid sites with temporarily insufficient supply of renewable energy, according to some embodiments.

During low traffic hours, interference is low and a neighbouring cell with renewable power can often serve user equipment 130 with sufficient quality.

Renewable power systems may be over dimensioned to allow for future traffic growth. Also solar, hydro and/or wind power sites need to be dimensioned for normal intermittent variations in wind speed, water flow and/or solar radiation. Many renewable sites may therefore often have an energy surplus, e.g. during a windy or a sunny day, stored in a charged battery 140.

The present method may also enable operators to cost effectively reduce the carbon dioxide emissions caused by their network operation by using renewable, clean energy whenever possible.

Figure 5:
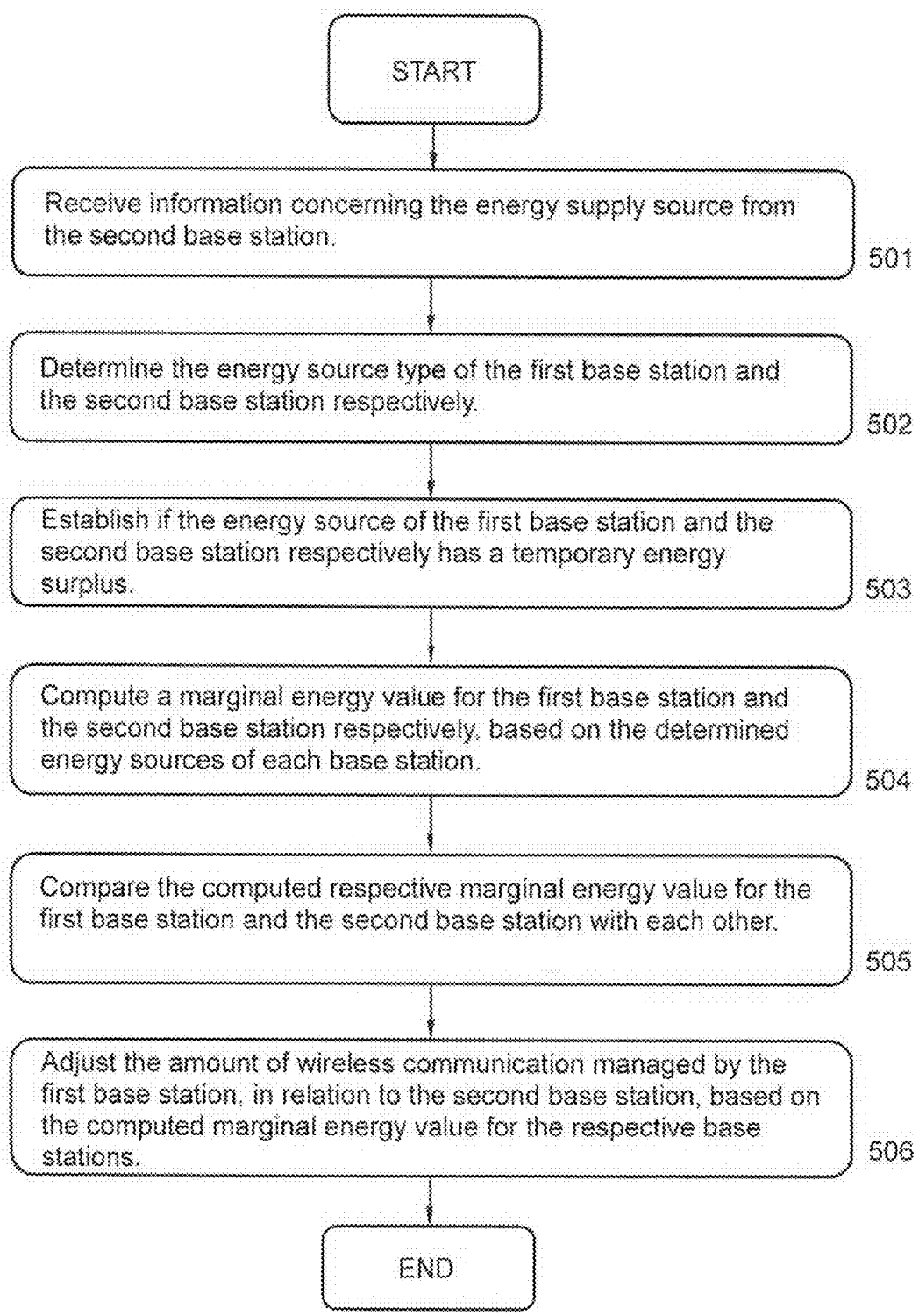
FIG. 5 is a flow chart illustrating method steps in a communication system according to some embodiments.

FIG. 5 is a flow chart illustrating method steps in an energy management unit 105 in a communication system 100 according to some embodiments. The method aims at performing energy consumption balancing between a first base station 110 and a second base station 120 comprised within the communication system 100.

To appropriately perform energy consumption balancing, the method may comprise a number of method steps 501-506.

It is however to be noted that some of the described method steps 501-506 are optional and only comprised within some embodiments. Further, it is to be noted that the method steps 501-506 may be performed in another chronological order and that some of them, e.g. step 501 and step 502, or even all steps 501-506 may be performed in a different, altered, arbitrarily rearranged, decomposed or even completely reversed chronological order, according to different embodiments. The method may comprise the following steps:

Step 501

This step is optional and may only be performed within some embodiments.

Information concerning the energy supply source may be received from the second base station 120, according to some embodiments wherein the energy management unit 105 is comprised within the first base station 110.

According to some embodiments, information concerning the energy supply source may be received from the first base station 110 and the second base station 120, according to some embodiments, wherein the energy management unit 105 is comprised within a centralized node.

Step 502

This step is optional and may only be performed within some embodiments.

The energy source type 150, 152, 154 of the first base station 110 and the second base station 120 respectively may be determined.

Step 503

This step is optional and may only be performed within some embodiments.

It may be established if the energy source 150, 152 of the first base station 110 and the second base station 120, respectively has a temporary energy surplus, according to some embodiments.

Step 504

A marginal energy value for the first base station 110 and the second base station 120 respectively is computed, based on the energy source type 150, 152, 154 of each base station 110, 120.

The marginal energy value may according to some embodiments be further based on at least one parameter out of: marginal energy cost, marginal energy carbon dioxide emission, energy reliability information, cell coverage overlap, renewability of the energy source and/or level of temporary energy surplus of the energy source.

According to some embodiments, any of the following parameters may render a high marginal energy value for the base station 110, 120: high marginal energy cost, high marginal energy carbon dioxide emission, low energy reliability, low cell coverage overlap, low renewability of the energy source, low level of temporary energy surplus of the energy source.

Step 505

The computed respective marginal energy value for the first base station 110 and the second base station 120 is compared with each other.

Step 506

The amount of wireless communication managed by the first base station 110 is adjusted, in relation to the second base station 120, such that the amount of wireless communication managed by the first base station 110 is increased if the first base station 110 has a lower marginal energy value than the second base station 120, and/or the amount of wireless communication managed by the first base station 110 is decreased if the first base station 110 has a higher marginal energy value than the second base station 120.

The adjustment of the amount of wireless communication may optionally comprise adjusting cell reference power, antenna tilt and/or adjusting handover threshold parameters, such that if the amount of wireless communication managed by the first base station 110 is to be increased, the cell reference power may be increased, the antenna may be tilted upwards and/or handover threshold parameters for performing a handover into the first base station 110 from the second base station 120 may be decreased. Further, if the amount of wireless communication managed by the first base station 110 is to be decreased, the cell reference power may be decreased, the antenna may be tilted downwards and/or handover threshold parameters for performing a handover into the first base station 110 from the second base station 120 may be increased, according to some embodiments.

Further, the adjustment of the amount of wireless communication managed by the first base station 110, in relation to the second base station 120 may comprise increasing the amount of wireless communication managed by the first base station 110, if the first base station 110 comprises a local renewable energy source 150, 152 and the second base station 120 is attached to the power grid or to a diesel generator 154. Alternatively, according to some embodiments, the adjustment may comprise increasing the amount of wireless communication managed by the first base station 110 if the first base station 110 is attached to the power grid and the second base station 120 is attached to a diesel generator 154.

Further yet, according to some embodiments, adjusting the amount of wireless communication managed by the first base station 110 may comprise increasing the amount of wireless communication managed by the first base station 110, if the energy source 150, 152 of the first base station 110 comprises a renewable energy source 150, 152 with a temporary energy surplus, and the second base station 120 comprises a non-renewable energy source 154 or a renewable energy source 150, 152 without a temporary energy surplus.

The base stations 110, 120 may comprise multiple radio access technologies, such as a first and a second radio access technology according to some embodiments. Thus, the adjustment of the amount of wireless communication managed by the first base station 110, in relation to the second base station 120 may comprise to only adjust the amount of wireless communication on the first radio access technology and not on the second radio access technology.

Figure 6:
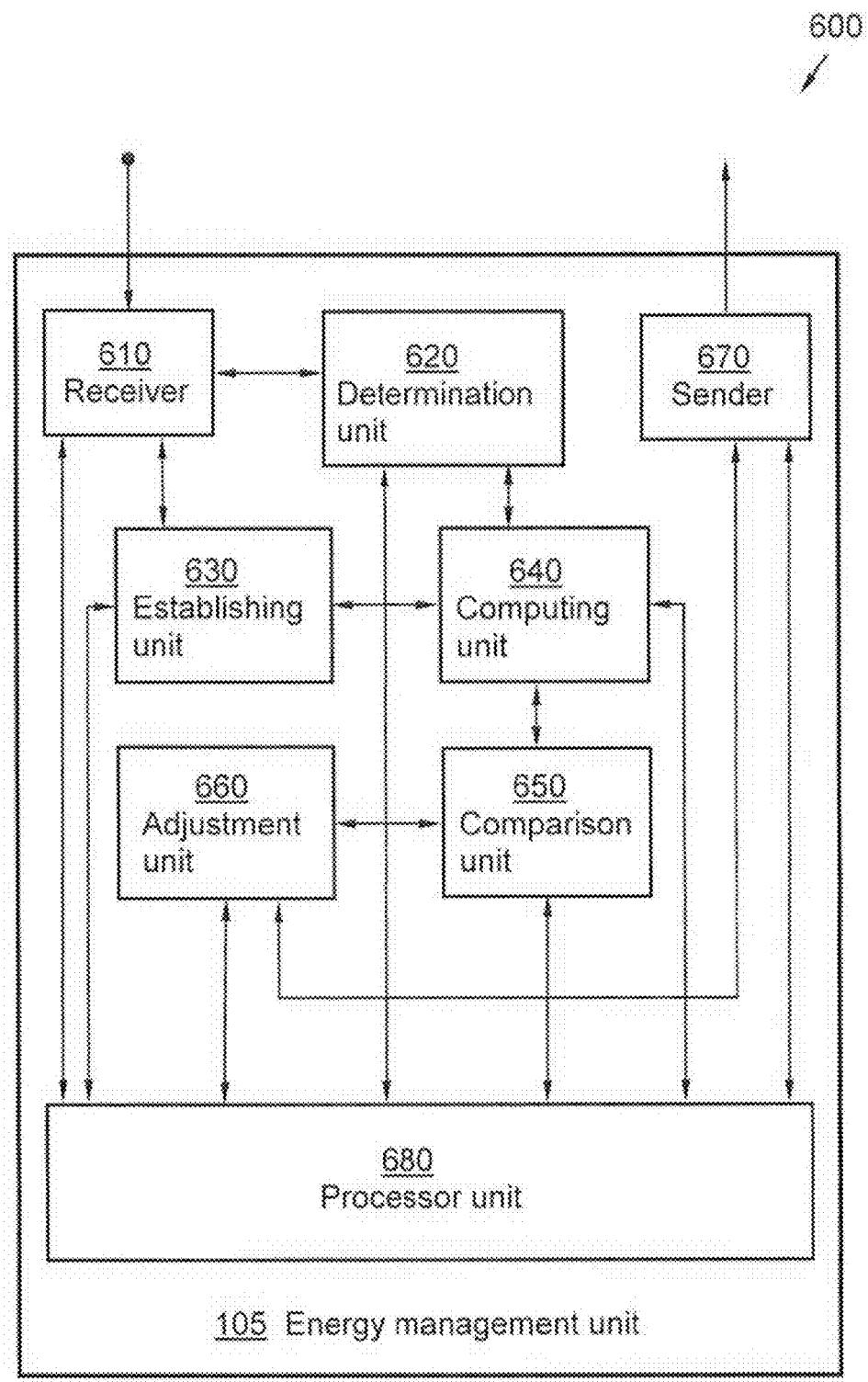
FIG. 6 is a block diagram illustrating embodiments of an arrangement in an energy management unit.

FIG. 6 is a block diagram illustrating embodiments of an arrangement 600 situated in an energy management unit 105 in a communication system 100. The arrangement 600 is adapted to perform the described method steps 501-506, for energy consumption balancing between a first base station 110 and a second base station 120 comprised within the communication system 100.

For the sake of clarity, any internal electronics of the arrangement 600, not completely necessary for understanding the performance of the method steps 501-506 has been omitted from FIG. 6.

The arrangement 600 comprises a computing unit 640. The computing unit 640 is adapted to compute a marginal energy value for the first base station 110 and the second base station 120 respectively, based on the energy source type 150, 152, 154 of each base station 110, 120. Also, in addition, the arrangement 600 comprises a comparison unit 650. The comparison unit 650 is adapted to compare the computed respective marginal energy value for the first base station 110 and the second base station 120 with each other. Furthermore, the arrangement 600 comprises an adjustment unit 660. The adjustment unit 660 is adapted to adjust the amount of wireless communication managed by the first base station 110, in relation to the second base station 120, such that the amount of wireless communication managed by the first base station 110 is increased if the first base station 110 has a lower marginal energy value than the second base station 120, and/or if the amount of wireless communication managed by the first base station 110 is decreased if the first base station 110 has a higher marginal energy value than the second base station 120.

The arrangement 600 may according to some embodiments comprise a receiver 610. The receiver 610 may be adapted to receive information concerning the energy supply source from the first base station 110 and/or the second base station 120.

Further, according to some embodiments, the arrangement 600 may optionally comprise a determination unit 620. The determination unit 620 may be adapted to determine the energy source type 150, 152, 154 of the first base station 110 and the second base station 120 respectively.

Additionally, according to some embodiments, the arrangement 600 may also comprise an establishing unit 630.

The establishing unit 630 may be adapted to establish if the energy source 150, 152 of the first base station 110 and the second base station 120, respectively has a temporary energy surplus.

According to some optional embodiments, the arrangement 600 further, in addition may comprise a sender 670. The sender 670 may be adapted to send information for adjusting cell reference power, antenna tilt and/or adjusting handover threshold parameters of a base station 110, 120.

The arrangement 600 may according to some embodiments further comprise a processing unit 680. The processing unit 680 may be represented by e.g. a Central Processing Unit (CPU), a processor, a microprocessor, or other processing logic that may interpret and execute instructions. The processing unit 680 may perform data processing functions for inputting, outputting, and processing of data including data buffering and device control functions, such as call processing control, user interface control, or the like.

It is to be noted that the described units 610-680 comprised within the arrangement 600 may be regarded as separate logical entities, but not with necessity as separate physical entities. Any, some or all of the units 610-680 may be comprised or co-arranged within the same physical unit. However, in order to facilitate the understanding of the functionality of the arrangement 600, the comprised units 610-680 are illustrated as separate units in FIG. 6.

Thus the transmitting unit 670 and e.g. the receiving unit 610 may, according to some embodiments, be comprised within one physical unit, a transceiver, which may comprise a transmitter circuit and a receiver circuit, which respectively transmits outgoing radio frequency signals and receives incoming radio frequency signals via an optional antenna.

Particular Embodiments in a Communication System 100

The method steps 501-506 in the communication system 100 may be implemented through one or more processing units 680 in the communication system 100, together with computer program code for performing the functions of the present steps 501-506. Thus a computer program product, comprising instructions for performing the method steps 501-506 in the communication system 100 may perform method steps in an energy management unit 105 in the communication system 100 for energy consumption balancing between a first base station 110 and a second base station 120 comprised within the communication system 100, when loaded into the processing unit 680.

The computer program product mentioned above may be provided for instance in the form of a data carrier carrying computer program code for performing the method steps 501-506 according to the present solution when the computer program product is run on the processing unit 680 comprised within the energy management unit 105. The data carrier may be e.g. a hard disk, a CD ROM disc, a memory stick, an optical storage device, a magnetic storage device or any other appropriate medium such as a disc or tape that can hold machine readable data. The computer program product may furthermore be provided as computer program code on a server and downloaded to the energy management unit 105 remotely, e.g. over an Internet or an intranet connection.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a communication system for managing energy consumption of base stations within the communication system, the method comprising:
   computing a marginal energy value for a first base station based on an energy source type of the first base station;
   computing a marginal energy value for a second base station based on an energy source type of the second base station;
   comparing the marginal energy value for the first base station and the marginal energy value for the second base station; and
   adjusting an amount of wireless communication managed by the first base station in relation to the second base station, such that:
      the amount of wireless communication managed by the first base station is increased if the first base station has a lower marginal energy value than the second base station; or
      the amount of wireless communication managed by the first base station is decreased if the first base station has a higher marginal energy value than the second base station.

2. The method of claim 1, further comprising:
   determining the energy source type of the first base station; and
   determining the energy source type of the second base station.

3. The method of claim 1, wherein computing the marginal energy value of the first base station comprises computing the marginal energy value of the first base station based on at least one of the following parameters: a marginal energy cost, a marginal energy carbon dioxide emission, energy reliability information, cell coverage overlap, renewability of the energy source, and a level of temporary energy surplus of an energy source for the first base station.

4. The method of claim. 1, wherein adjusting the amount of wireless communication managed by the first base station comprises adjusting a cell reference power of the first base station such that:
   if the amount of wireless communication managed by the first base station is to be increased, the cell reference power of the first base station is increased; or
   if the amount of wireless communication managed by the first base station is to be decreased, the cell reference power of the first base station is decreased.

5. The method of claim 1, wherein adjusting the amount of wireless communication managed by the first base station comprises adjusting an antenna tilt for an antenna of the first base station such that:
   if the amount of wireless communication managed by the first base station is to be increased, the antenna is tilted upwards; or
   if the amount of wireless communication managed by the first base station is to be decreased, the antenna is tilted downwards.

6. The method of claim 1, wherein adjusting the amount of wireless communication managed by the first base station comprises adjusting handover threshold parameters, such that:
- if the amount of wireless communication managed by the first base station is to be increased, the handover threshold parameters for performing a handover to the first base station from the second base station are decreased; or
- if the amount of wireless communication managed by the first base station is to be decreased, the handover threshold parameters for performing a handover to the first base station from the second base station are increased.

7. The method of claim 1, wherein adjusting the amount of wireless communication managed by the first base station in relation to the second base station comprises:
- increasing the amount of wireless communication managed by the first base station if the first base station comprises a local renewable energy source and the second base station is attached to the power grid or to a diesel generator; or
- increasing the amount of wireless communication managed by the first base station if the first base station is attached to the power grid and the second base station is attached to a diesel generator.

8. The method of claim 1, further comprising:
- determining whether the energy source of the first base station has a temporary energy surplus; and
- determining whether the energy source of the second base station has a temporary energy surplus; and wherein adjusting the amount of wireless communication managed by the first base station comprises:
- increasing the amount of wireless communication managed by the first base station if the energy source of the first base station comprises a renewable energy source with a temporary energy surplus, and the second base station comprises a non-renewable energy source or a renewable energy source without a temporary energy surplus.

9. The method of claim 1, wherein the base stations support a first radio access technology and a second radio access technology, and wherein adjusting the amount of wireless communication managed by the first base station in relation to the second base station comprises only adjusting an amount of wireless communication on the first radio access technology and not an amount of wireless communication on the second radio access technology.

10. The method of claim 1, wherein computing the marginal energy value for the second base station comprises:
- receiving, at the first base station, information from the second base station concerning the energy supply source of the second base station; and
- computing the marginal energy value for the second base station at the first base station.

11. The method of claim 1, wherein computing the marginal energy value for the first base station comprises:
- receiving, at a network node, information from the first base station concerning the energy supply source of the first base station; and
- computing, at the network node, the marginal energy value for the first base station, and wherein computing the marginal energy value of the second base station comprises:
- receiving, at the network node, information from the second base station concerning the energy supply source of the second base station; and
- computing, at the network node, the marginal energy value for the second base station.

12. The method of claim 1, wherein computing the marginal energy value of the first base station comprises computing the marginal energy value based on one or more of the following parameters: a marginal energy cost, a marginal energy carbon dioxide emission, an energy reliability, a cell coverage overlap, a renewability of the energy source, and a level of temporary energy surplus of the energy source for the first base station.

13. An energy management apparatus in a communication system for managing energy consumption of base stations within the communication system, the energy management unit comprising:
- a computing unit configured to:
    - compute a marginal energy value for a first base station based on an energy source type of the first base station; and
    - compute a marginal energy value for a second base station based on an energy source type of the second base station;
- a comparison unit configured to compare the marginal energy value for the first base station and the marginal energy value for the second base station; and
- an adjustment unit configured to adjust an amount of wireless communication managed by the first base station in relation to the second base station, such that:
    - the amount of wireless communication managed by the first base station is increased if the first base station has a lower marginal energy value than the second base station; or
    - the amount of wireless communication managed by the first base station is decreased if the first base station has a higher marginal energy value than the second base station.

14. The apparatus of claim 13, further comprising a determination unit configured to:
- determine the energy source type of the first base station; and
- determine the energy source type of the second base station.

15. The apparatus of claim 13, wherein the computing unit is configured to compute the marginal energy value of the first base station by computing the marginal energy value of the first base station based on at least one of the following parameters: a marginal energy cost, a marginal energy carbon dioxide emission, energy reliability information, cell coverage overlap, renewability of the energy source, and a level of temporary energy surplus of an energy source for the first base station.

16. The apparatus of claim 13, wherein the adjustment unit is further configured to adjust the amount of wireless communication managed by the first base station by adjusting a cell reference power of the first base station such that:
- if the amount of wireless communication managed by the first base station is to be increased, the cell reference power of the first base station is increased; or
- if the amount of wireless communication managed by the first base station is to be decreased, the cell reference power of the first base station is decreased.

17. The apparatus of claim 13, wherein the adjustment unit is further configured to adjust the amount of wireless communication managed by the first base station by adjusting an antenna tilt for an antenna of the first base station such that:
- if the amount of wireless communication managed by the first base station is to be increased, the antenna is tilted upwards; or if the amount of wireless communication managed by the first base station is to be decreased, the antenna is tilted downwards.

18. The apparatus of claim 13, wherein the adjustment unit is further configured to adjust the amount of wireless communication managed by the first base station by adjusting handover threshold parameters, such that:
- if the amount of wireless communication managed by the first base station is to be increased, the handover threshold parameters for performing a handover to the first base station from the second base station are decreased; or
- if the amount of wireless communication managed by the first base station is to be decreased, the handover threshold parameters for performing a handover to the first base station from the second base station are increased.

19. The apparatus of claim 13, wherein the adjustment unit is further configured to adjust the amount of wireless communication managed by the first base station in relation to the second base station by:
- increasing the amount of wireless communication managed by the first base station if the first base station comprises a local renewable energy source and the second base station is attached to the power grid or to a diesel generator; or
- increasing the amount of wireless communication managed by the first base station if the first base station is attached to the power grid and the second base station is attached to a diesel generator.

20. The apparatus of claim 13, further comprising a determination unit configured to:
- determine whether the energy source of the first base station has a temporary energy surplus; and
- determine whether the energy source of the second base station has a temporary energy surplus; and wherein adjusting the amount of wireless communication managed by the first base station comprises:
- increase the amount of wireless communication managed by the first base station if the energy source of the first base station comprises a renewable energy source with a temporary energy surplus, and the second base station comprises a non-renewable energy source or a renewable energy source without a temporary energy surplus.

21. The apparatus of claim 13, wherein the adjustment unit is configured to adjust the amount of wireless communication managed by the first base station in relation to the second base station by only adjusting an amount of wireless communication on a first radio access technology supported by the base stations and not an amount of wireless communication on a second radio access technology supported by the base stations.

22. The apparatus of claim 13, wherein the computing unit is configured to compute the marginal energy value for the second base station by:
- receiving, at the first base station, information from the second base station concerning the energy supply source of the second base station; and
- computing the marginal energy value for the second base station at the first base station.

23. The apparatus of claim 13, wherein the computing unit is configured to compute the marginal energy value for the first base station by:
- receiving, at a network node, information from the first base station concerning the energy supply source of the first base station; and
- computing, at the network node, the marginal energy value for the first base station, and wherein the computing unit is configured to compute the marginal energy value of the second base station comprises:
- receiving, at the network node, information from the second base station concerning the energy supply source of the second base station; and
- computing, at the network node, the marginal energy value for the second base station.

24. The apparatus of claim 13, wherein the computing unit is configured to compute the marginal energy value of the first base station by computing the marginal energy value based on one or more of the following parameters: a marginal energy cost, a marginal energy carbon dioxide emission, an energy reliability, a cell coverage overlap, a renewability of the energy source, and a level of temporary energy surplus of the energy source for the first base station.

* * * * *

UNITED STATES PATENT AND TRADEMARK OFFICE
CERTIFICATE OF CORRECTION

| | | |
|---|---|---|
| PATENT NO. | : 8,831,672 B2 | Page 1 of 1 |
| APPLICATION NO. | : 13/514630 | |
| DATED | : September 9, 2014 | |
| INVENTOR(S) | : Frenger et al. | |

It is certified that error appears in the above-identified patent and that said Letters Patent is hereby corrected as shown below:

In the Specification

In Column 4, Line 49, delete "(HDR)" and insert -- (HDR), --, therefor.

In the Claims

In Column 12, Line 48, in Claim 4, delete "claim." and insert -- claim --, therefor.

Signed and Sealed this
Twenty-fifth Day of August, 2015

Michelle K. Lee
*Director of the United States Patent and Trademark Office*